United States Patent
Tsunoda (10) Patent No.: US 9,217,366 B2
(45) Date of Patent: Dec. 22, 2015

(54) INTERNAL COMBUSTION ENGINE AND CONTROL METHOD THEREFOR

(71) Applicant: ISUZU MOTORS LIMITED, Tokyo (JP)

(72) Inventor: Hiroshi Tsunoda, Chigasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 40 days.

(21) Appl. No.: 14/369,367

(22) PCT Filed: Nov. 20, 2012

(86) PCT No.: PCT/JP2012/080071
§ 371 (c)(1),
(2) Date: Jun. 27, 2014

(87) PCT Pub. No.: WO2013/108481
PCT Pub. Date: Jul. 25, 2013

(65) Prior Publication Data
US 2014/0366832 A1 Dec. 18, 2014

(30) Foreign Application Priority Data

Jan. 19, 2012 (JP) ................................. 2012-008920

(51) Int. Cl.
*F02B 75/06* (2006.01)
*F02B 77/00* (2006.01)
(Continued)

(52) U.S. Cl.
CPC ............... *F02B 77/00* (2013.01); *B60W 10/06* (2013.01); *B60W 10/08* (2013.01); *B60W 30/20* (2013.01);
(Continued)

(58) Field of Classification Search
CPC ....... F16F 15/264; F16F 15/265; F16F 15/26; F16F 15/283; F16F 15/28; F16F 15/322; F16F 15/005; F16F 15/027; F16F 15/12; F16F 15/18; F16F 15/31; F16F 2230/0011; F16F 7/00; F02B 75/065; F02B 67/06
USPC .......... 123/192.1, 192.2, 192.3, 197.1–197.5; 475/224, 306, 91, 115, 198, 223
See application file for complete search history.

(56) References Cited

U.S. PATENT DOCUMENTS 3,145,695 A * 8/1964 Conover ................ F02F 7/0031
123/192.2
5,065,644 A * 11/1991 Shimada ................. F02B 61/02
123/192.2
(Continued)

FOREIGN PATENT DOCUMENTS

GB 121045 12/1918
JP 7-35198 2/1995
(Continued)

OTHER PUBLICATIONS

International Search Report mailed Feb. 26, 2013 in corresponding International Patent Application No. PCT/JP2012/080071.

*Primary Examiner* — Lindsay Low
*Assistant Examiner* — Long T Tran
(74) *Attorney, Agent, or Firm* — Staas & Halsey LLP (57) ABSTRACT

An engine including: a primary balancer driven by a crankshaft via a gear drive device and rotates in a direction reverse to a direction of the crankshaft; an electric motor driven by the primary balancer via a belt drive device to rotate in a direction reverse to the direction of the crankshaft; an auxiliary flywheel provided to a rotary shaft of the electric motor via a clutch. An engine control unit including a first device for increasing and decreasing effective moment of inertia around the crankshaft by engaging or disengaging the clutch in accordance with an operating condition of the engine, and a second device for controlling torque to be transmitted to the gear drive device via the belt drive device by power-driving or regeneratively driving the electric motor in accordance with a crank angular acceleration.

6 Claims, 4 Drawing Sheets

(51) Int. Cl.
*B60W 10/08* (2006.01)
*F02N 11/04* (2006.01)
*B60W 10/06* (2006.01)
*B60W 30/20* (2006.01)
*F02N 15/02* (2006.01)
*F02N 15/08* (2006.01)

(52) U.S. Cl.
CPC .............. *F02B 75/06* (2013.01); *F02N 11/04* (2013.01); *F02N 15/022* (2013.01); *F02N 15/08* (2013.01); *B60W 2030/206* (2013.01); *B60W 2510/0638* (2013.01); *B60W 2510/0652* (2013.01)

(56) References Cited

U.S. PATENT DOCUMENTS

| | | | | |
|---|---|---|---|---|
| 5,255,646 | A * | 10/1993 | Inagaki | F02B 75/06 123/192.1 |
| 6,056,662 | A * | 5/2000 | Fini, Jr. | F16H 3/721 475/224 |
| 6,192,851 | B1 * | 2/2001 | Asahara | F02B 67/06 123/192.2 |
| 6,263,223 | B1 * | 7/2001 | Shepherd | A61B 5/0088 600/340 |
| 6,725,974 | B2 * | 4/2004 | Sato | F02B 67/04 123/192.2 |
| 6,752,117 | B2 * | 6/2004 | Purcell | F01M 11/02 123/192.2 |
| 6,868,815 | B2 * | 3/2005 | Carden | B60K 6/485 123/192.2 |
| 7,284,518 | B2 * | 10/2007 | Romblom | F01L 1/02 123/195 A |
| 2010/0275713 | A1 * | 11/2010 | Penttila | B62K 5/01 74/473.3 |
| 2011/0209680 | A1 * | 9/2011 | Katayama | F16F 15/265 123/192.2 |

FOREIGN PATENT DOCUMENTS

| | | |
|---|---|---|
| JP | 11-82094 | 3/1999 |
| JP | 11-351333 | 12/1999 |
| JP | 2000-248958 | 9/2000 |
| JP | 2004-533575 | 11/2004 |
| JP | 2006-46456 | 2/2006 |
| JP | 2010-261566 | 11/2010 |
| JP | 2011-122566 | 6/2011 |
| WO | WO 03/004845 A1 | 1/2003 |

* cited by examiner

INTERNAL COMBUSTION ENGINE AND CONTROL METHOD THEREFOR

CROSS-REFERENCE TO RELATED APPLICATIONS

This application claims the benefit under 35 U.S.C. Section 371, of PCT International Application No. PCT/JP2012/080071, filed Nov. 20, 2012, and under 35 U.S.C. §119 of Japanese Application No. 2012-008920, filed Jan. 19, 2012, the contents of which are incorporated herein by reference.

TECHNICAL FIELD

The present invention relates to: an internal combustion engine capable of suppressing gear noises occurring when the internal combustion engine is equipped with a gear-driven balancer configured to suppress vibrations due to fluctuations in torque of the internal combustion engine; and a method of controlling the same.

BACKGROUND ART

For the purpose of a reduction in fuel consumption, much research has been now carried out to reduce the engine displacement and the number of cylinders, and its results are turned into practical use. Yet, no engine (internal combustion engine) with a smaller number of cylinders has come into reality because of a problem of maximum torque. Generally speaking, rolling vibrations caused by fluctuations in torque is a problem for reciprocating engines with a small number of cylinders, particularly reciprocating engines with three or less cylinders.

As a countermeasure for this problem, there is a device provided with an inertial system which rotates in a direction reverse to that of the engine, and configured to reduce rolling vibrations of the engine by offsetting torque recoil force caused around a crankshaft by torque recoil force generated by the inertial system (see Patent Document 1, for example). This device is so-called a Heron balancer. Devices of this type configured to create the inertial system that rotates in the direction reverse to that of the engine include: a device which uses a generator; a device to which a weight is newly added; and a device in which a weight is added to a primary balancer.

In addition, there is also a device including two balancer shafts disposed as rotary shafts in parallel with a rotational axis of a crankshaft, and a generator-driver installed on at least one of the two balancers, and configured to offset fluctuations in torque by braking torque and driving torque of the generator-driver (see Patent Document 2, for example).

However, another problem arises from the above-mentioned devices because the inertial system, which rotates in the direction reverse to that of the engine, is gear-driven. The engine produces torque recoil force accompanying the fluctuations in the torque because of its intermittent combustion. Particularly, as the number of cylinders becomes smaller, the value representing the torque recoil force becomes larger. As a result, the torque recoil force accompanying the fluctuations in the torque causes a rotational fluctuation speed. At the time of acceleration, the gears are rotated in such a way that a tooth surface on one side presses a tooth surface on the driven side. At the time of deceleration, however, since the gear on the driven side belongs to a different inertial system, the tooth surfaces are detached from each other, and the gear on the driven side comes into contact with a back surface of the next gear tooth. At this time, a clanking noise occurs. Subsequently, in the next acceleration, the original tooth surfaces come into contact again to drive the gear. At this time, a clanking noise occurs again. In short, in exchange for the reduction in the rolling vibrations, each of the above-mentioned devices gear-driven by the crankshaft causes gear noises such as the clanking noises.

The phenomenon becomes more noticeable as the moment of inertia on the driven side is increased for the purpose of offsetting the torque recoil force. The distance each tooth moves is called gear backlash, which cannot be reduced to zero. The clanking noises become louder as the moment of inertia on the driven side becomes larger.

To deal with this problem, there is a device including two balancer shafts driven by gears, in which an oil pump is connected to one of the two balancer shafts. The device is configured to reduce gear noises by making the phase of the rotational fluctuation speed of the engine coincide with the phase of the rotational fluctuation speed of the oil pump (see Patent Document 3, for example).

This device, however, produces loud clanking noises from torsional vibrations of the shaft caused by the torque recoil force associated with the fluctuations in the torque, because the oil pump functioning as a large inertial body is directly attached via the gear. Furthermore, this device requires large modifications to be made to the engine.

In sum, when the rotational body gear-driven by the crankshaft and configured to rotate in the direction reverse to that of the crankshaft is provided for the purpose of suppressing the torque recoil force associated with the fluctuations in the torque, the moment of inertia becomes larger and leads to occurrence of gear noises. Furthermore, the larger moment of inertia causes problems such as deterioration in fuel efficiency and delay in acceleration response.

PRIOR ART DOCUMENTS

Patent Document 1: United Kingdom patent application publication GB-A-121045
Patent Document 2: Japanese patent application Kokai publication No. 2000-248958
Patent Document 3: Japanese patent application Kokai publication No. 2006-46456

SUMMARY OF THE INVENTION

The present invention has been made with the foregoing problems taken into consideration. An object of the present invention is to provide: an internal combustion engine capable of reducing its vibrations and gear noises produced in association with the reduction in the vibrations; and a method of controlling the same.

To attain the object, an internal combustion engine of the present invention is provided with a balancer which is driven by a crankshaft of the internal combustion engine via a gear drive device and rotates in a direction reverse to a direction in which the crankshaft rotates, and an electric motor which is driven by the balancer via a belt drive device and rotates in a direction reverse to the direction in which the crankshaft rotates. Here, the internal combustion engine includes: a flywheel provided to a rotary shaft of the electric motor via a clutch; and a control unit configured to control torque to be transmitted to the gear drive device via the belt drive device by engaging or disengaging the clutch in accordance with an operating condition of the internal combustion engine, and power-driving or regeneratively driving the electric motor in accordance with a crank angular acceleration at least when the operating condition of the internal combustion engine is for normal running and idling.

According to this configuration, vibrations of the internal combustion engine can be reduced in accordance with the operating condition of the internal combustion engine by use of the means for: controlling the clutch in accordance with the operating condition of the internal combustion engine; and controlling the electric motor in accordance with the crank angular acceleration at least when the operating condition of the internal combustion engine is for normal running and idling. Concurrently, it is possible to reduce gear noises which are caused by moment of inertia increased by the provision of the balancer and the flywheel.

In addition, in the internal combustion engine, the belt drive device may include: a first pulley to rotate integrally with the balancer; and a second pulley to rotate faster than the rotation of the crankshaft by being belt-driven by the first pulley. When the flywheel is connected to the second pulley via the clutch, the flywheel is rotated faster by the second pulley. For this reason, torque recoil force associated with fluctuations in the torque of the combustion engine can be suppressed by use of less moment of inertia.

Furthermore, the gear drive device configured to solely drive the balancer can facilitate suppression of the gear noises. Moreover, when the gear receives the torque recoil force associated with the fluctuations in the torque the belt stretches momentarily and the belt tension bears part of the load. Thus, the gear noises can be reduced.

What is more, in the internal combustion engine, the control unit includes: means for compensating for a reduction in torque of the flywheel caused due to the belt drive device by engaging the clutch and power-driving or regeneratively driving the electric motor when the operating condition of the internal combustion engine is for the normal running; means for reducing torque recoil force of the crankshaft by disengaging the clutch and power-driving or regeneratively driving the electric motor when the operating condition of the internal combustion engine is idling except idling stop; and means for reducing effective moment of inertia around the crankshaft by disengaging the clutch when the operating condition of the internal combustion engine is acceleration except for starting. This makes it possible to solve a problem of gear noises which are caused by an increase in the moment of inertia produced by the electric motor and the flywheel, and to solve problems such as deterioration in fuel efficiency and delay in acceleration response.

When the operating condition of the internal combustion engine is for normal running, the torque recoil force associated with the fluctuations in the torque of the internal combustion engine can be reduced by engaging the clutch, and thereby transmitting driving torque of the flywheel. In addition, the torque recoil force can be reduced while compensating for a loss of the torque of the flywheel caused by phase lags and a reduction in the driving torque which result from intervention of the belt drive device. Thereby, the gear noises can be reduced. This scheme is effective particularly during constant running at low speed while vibrations caused by the fluctuations in the torque are significant.

In addition, when the operating condition of the internal combustion engine is idling except idling stop, meshing force of the gear drive device can be reduced and the gear noises can be accordingly reduced by disengaging the clutch, and decreasing the driving torque to be transmitted to the gear drive device. The torque recoil force can be reduced by power-driving or regeneratively driving the electric motor in accordance with the crank angular acceleration.

Furthermore, when the operating condition of the internal combustion engine is acceleration except for starting, acceleration response and fuel efficiency can be enhanced by disengaging the clutch and thereby decreasing the effective moment of inertia around the crankshaft.

Meanwhile, a method of controlling an internal combustion engine for solving the problems is a method of controlling an internal combustion engine provided with a balancer which is gear-driven by a crankshaft of the internal combustion engine and rotates in a direction reverse to a direction in which the crankshaft rotates, and an electric motor which is belt-driven by the balancer and rotates in a direction reverse to the direction in which the crankshaft rotates. Here, the method includes: controlling torque to be applied to the gear driving by engaging or disengaging the clutch in accordance with an operating condition of the internal combustion engine, and power-driving or regeneratively driving the electric motor in accordance with a crank angular acceleration at least when the operating condition of the internal combustion engine is for normal running and idling.

Moreover, in the above-described method of controlling an internal combustion engine includes: compensating for a reduction in torque of the flywheel caused due to the belt driving by engaging the clutch and power-driving or regeneratively driving the electric motor when the operating condition of the internal combustion engine is for normal running; reducing torque recoil force of the crankshaft by disengaging the clutch and power-driving or regeneratively driving the electric motor when the operating condition of the internal combustion engine is idling except idling stop; and reducing effective moment of inertia around the crankshaft by disengaging the clutch when the operating condition of the internal combustion engine is acceleration except starting.

According to this method, gear noises can be suppressed since: vibrations of the internal combustion engine can be suppressed by use of the balancer and the flywheel which rotate in the direction reverse to that of the crankshaft; and moment of inertia can be increased or decreased, as well as meshing force of the gear can be reduced, in accordance with the operating condition of the internal combustion engine.

Moreover, it is possible to suppress deterioration in the fuel efficiency and delay in acceleration response which both would be otherwise caused by an increase in the effective moment of inertia around the crank shaft. Thus, the vibrations of the internal combustion engine can be satisfactorily suppressed.

According to the present invention, it is possible to reduce the vibrations of the internal combustion engine, and to reduce the gear noises which are caused in association with the reduction in the vibrations. Furthermore, it is possible to solve the problems such as the deterioration in the fuel efficiency and the deterioration in the acceleration response which both would be otherwise caused by the increase in the moment of inertia in order to reduce the gear noises by reducing the torque recoil force.

DETAILED DESCRIPTION

Referring to the drawings, descriptions will be provided for an internal combustion engine and a method of controlling the same of an embodiment of the present invention. Although the embodiment will be described by using a diesel engine as an example, the present invention is not limited to the diesel engine and is applicable to a gasoline engine as well. It should be noted that dimensions in the drawings are changed in order to facilitate understanding of the configuration and ratios including the plate thickness, width, and length of members and components in the drawings do not always coincide with ratios of those actually manufactured.

Figure 1:
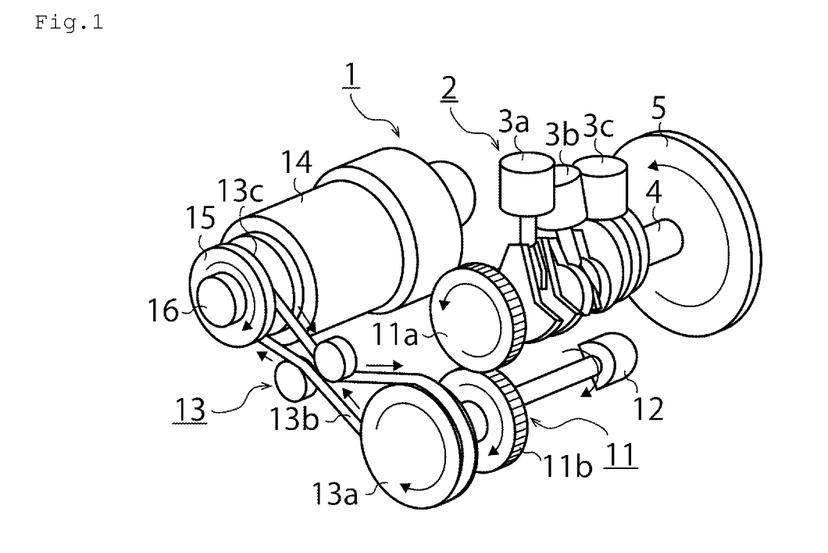
FIG. 1 is a perspective view showing an internal combustion engine of an embodiment of the present invention.
Figure 2:
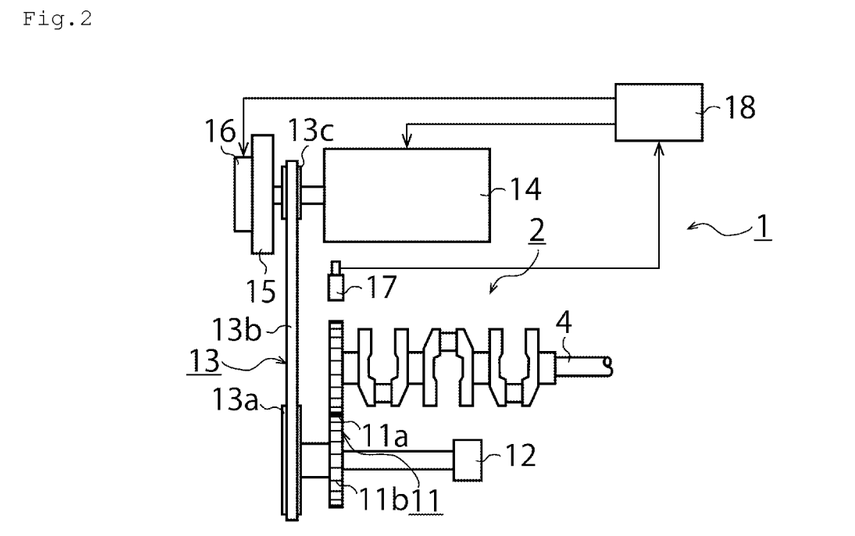
FIG. 2 is a schematic diagram of the internal combustion engine shown in FIG. 1 with an added control unit.

To begin with, referring to FIGS. 1 and 2, descriptions will be provided for the internal combustion engine of the embodiment of the present invention. As shown in FIG. 1, this engine (internal combustion engine) 1 includes an auxiliary flywheel 15 and a clutch 16 for the auxiliary flywheel (hereinafter referred to as a clutch) in addition to an engine body 2, a gear drive device 11, a primary balancer 12, a belt drive device 13, and an electric motor 14.

The engine body 2 includes: a crankshaft 4 configured to convert vertical reciprocating motion of three pistons 3a to 3c into rotary motion; and a primary flywheel 5. The engine body 2 is connected to a transmission (not illustrated) via the primary flywheel 5. Nevertheless, the engine body 2 does not always need the primary flywheel 5. In this embodiment, the engine body 2 is described on the assumption of being an inline three-cylinder engine. Nevertheless, no restriction is imposed on the number of cylinders or the cylinder arrangement.

The gear drive device 11 includes a driving gear 11a and a driven gear 11b. The driven gear 11b is a gear whose diameter is equal to that of the driving gear 11a in order to make the primary balancer 12 rotate at the same speed and in a direction reverse to the rotation of the crankshaft 4. It is desirable that the driven gear 11b be eccentrically arranged considering balance between the driven gear 11b and the primary balancer 12. In the embodiment, gear meshes with only one stage of the gear drive device 11. For this reason, gear noises can be controlled easily.

The primary balancer 12 is placed almost in parallel with the axis of the crankshaft 4, and rotates as described above. Since the primary balancer 12 rotates at the same speed and in the direction reverse to that of the crankshaft 4, the primary balancer 12 is capable of reducing pitching vibrations attributed to a primary inertia couple and rolling vibrations coming from 1.5-order torque recoil force. A balancer based on a well-known technique may be used as the primary balancer 12.

The belt drive device 13 is designed in such a way as to transmit rotation of a first pulley 13a, which is attached to the extremity of a shaft of the primary balancer 12, to a second pulley 13c via a belt 13b while increasing a rotational speed faster than the rotational speed of the crankshaft 4.

The belt drive device 13 only needs to be capable of transmitting the rotation of the primary balancer 12 to the second pulley 13c while increasing the rotational speed. Here, a tensioner or an idler may also be provided. When the driven gear 11b receives the torque recoil force, the provision of the belt drive device 13 makes it possible to reduce the gear noises because the belt 13b stretches momentarily and makes the belt tension bear part of the load.

The electric motor 14 is connected to the second pulley 13c, and is capable of power driving and regenerative driving. The electric motor 13 is so called a generator or a starter generator. In addition, the electric motor 14 may be designed to be capable of power generation when regeneratively driven, for example.

The auxiliary flywheel 15 is connected to the second pulley 13c via the clutch 16, and transmits its own driving torque to the gear drive device 11 via the second pulley 13c by engaging or disengaging the clutch 16.

In addition, as shown in FIG. 2, the engine 1 is connected to: a crank angle sensor 17; and an ECU (control device) 18 connected to the crank angle sensor 17 and configured to control actions of the electric motor 14 and the clutch 16. A crank angle sensor based on a well-known technique may be used as the crank angle sensor 17. Furthermore, the ECU 18 is a control device so called an engine control unit, which is a microcontroller configured to perform overall electrical control on the engine 1 using an electric circuit.

In the embodiment, the ECU 18 includes means for controlling the driving torque by: engaging or disengaging the clutch 16 in accordance with an operating condition of the engine 1; and controlling the electric motor 14 for power driving or regenerative driving in accordance with the crank angular velocity.

A method of calculating a crank angular acceleration only needs to be capable of calculating the crank angular acceleration. The method may use digital calculation, for example. Otherwise, the method may use an analog circuit configured to calculate the number of revolutions of the engine 1 from a value measured by the crank angle sensor 17, to convert the number of revolutions thereof into cycles, to subject that frequency to F/V conversion (a method of converting a pulse frequency into a voltage), and to differentiate the resultant value.

Figure 3:
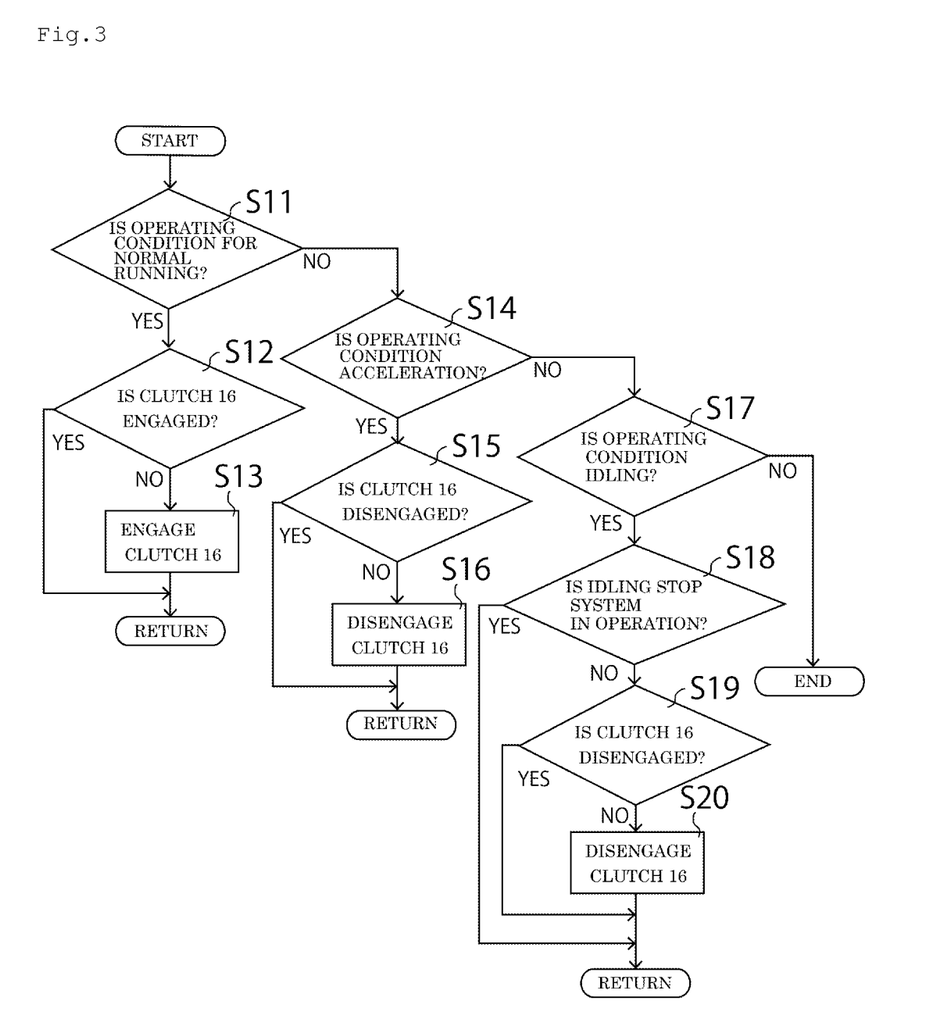
FIG. 3 is a flowchart showing first means for the internal combustion engine of the embodiment of the present invention.

Next, referring to a flowchart in FIG. 3, descriptions will be provided for how the clutch 16 is controlled in accordance with the operating condition of the engine 1. To begin with, in step S11, it is judged whether or not the operating condition of the engine 1 is for normal running. If it is judged in step S11 that the operating condition is for normal running, it is subsequently judged in step S12 whether or not the clutch 16 is engaged. If the engagement of the clutch 16 is confirmed in step S12, the flow returns to the start. If the engagement of the clutch 16 cannot be confirmed, the clutch 16 is engaged in the next step S13, and the flow returns to the start.

If it is judged in step S11 that the operating condition is not for normal running, it is subsequently judged in step S14 whether or not the operating condition of the engine 1 is acceleration. If it is judged in step S14 that the operating condition is acceleration, it is subsequently judged in step S15 whether or not the clutch 16 is disengaged. If the disengagement of the clutch 16 is confirmed in step S15, the flow returns to the start. If the disengagement of the clutch 16 cannot be confirmed, the clutch 16 is disengaged in step S16, and the flow returns to the start.

If it is judged in step S14 that the operating condition is not acceleration, it is subsequently judged in step S17 whether or not the operating condition of the engine 1 is idling. If it is judged in step S17 that the operating condition is idling, it is subsequently judged in step 18 whether or not an idling stop system is in operation. If it is judged in step S18 that the idling stop system is in operation, the flow returns to the start.

If it is judged in step S18 that the idling stop system is not in operation, it is subsequently judged in step S19 whether or not the clutch 16 is disengaged. If the disengagement of the clutch 16 is confirmed in step S19, the flow returns to the start. If the disengagement of the clutch 16 cannot be confirmed, the clutch 16 is disengaged in the next step S20, and the flow returns to the start.

If it is judged in step S17 that the operating condition is not idling, this control method is terminated. In this control method, the operating condition of the engine 1 is judged based on detection signals from the crank angle sensor 17. Here, the vehicle speed, accelerator opening, detection signals from a temperature sensor, and the like are preferably taken into consideration as well.

The method shown in FIG. 3 makes it possible to adjust effective moment of inertia around the crankshaft 4 by engaging or disengaging the clutch 16 in accordance with the operating condition of the engine 1, and to adjust the torque to be transmitted to the gear drive device 11 through the belt drive device 13.

Figure 4:
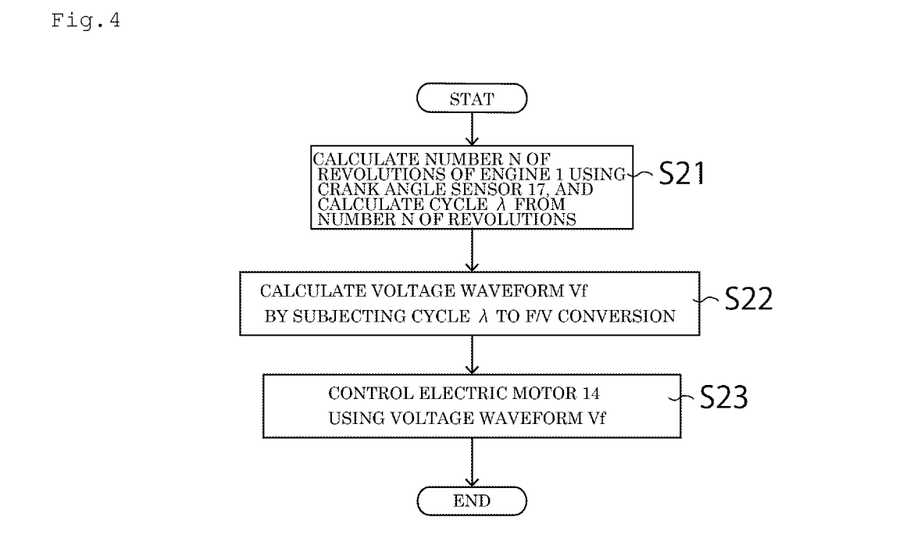
FIG. 4 is a flowchart showing second means for the internal combustion engine of the embodiment of the present invention.

Next, referring to a flowchart shown in FIG. 4, descriptions will be provided for how the driving torque is controlled by controlling the electric motor 14 for power driving or regenerative driving in accordance with the crank angular velocity. First of all, in step S21, the number N of revolutions of the engine 1 is calculated from detection signals from the crank angle sensor 17, and a cycle λ is calculated from the number N of revolutions. Subsequently, in step S22, a voltage waveform Vf representing a differentiated waveform of the cycle λ is calculated by subjecting the cycle λ to F/V conversion. Thereafter, in step S23, the electric motor 14 is controlled by use of the voltage waveform Vf. Hence, the method of controlling the driving torque is completed.

The torque recoil force is a product of the moment of inertia and the crank angular acceleration. With this taken into consideration, the voltage waveform Vf representing the differentiated waveform of the cycle λ is obtained by: calculating the period λ (the crank angular velocity) using the detection signals from the crank angle sensor 17; and subjecting the cycle λ to the F/V conversion. The controlling of the electric motor 14 using the voltage waveform Vf makes it possible to power-drive or regeneratively drive the electric motor 14 in perfect synchronism with the crank angular acceleration.

This method serves only needs to be capable of controlling the electric motor 14 for power driving or regenerative driving in accordance with the crank angular acceleration. For this reason, the configuration for the method is not limited to the foregoing example. The method may be carried out, for example, by use of an F/V converter (or a device called an F/V converting device).

The method shown in FIG. 4 makes it possible to control the electric motor 14 in accordance with the crank angular acceleration, or in other words, with fluctuations in the torque of the engine 1. The combination of the method shown in FIG. 4 with the method shown in FIG. 3 makes it possible to suppress the torque recoil force corresponding to the operating condition of the engine 1. In addition, this combination makes it possible to reduce meshing force of the gear drive device 11, and accordingly to suppress gear noises.

Figure 5:
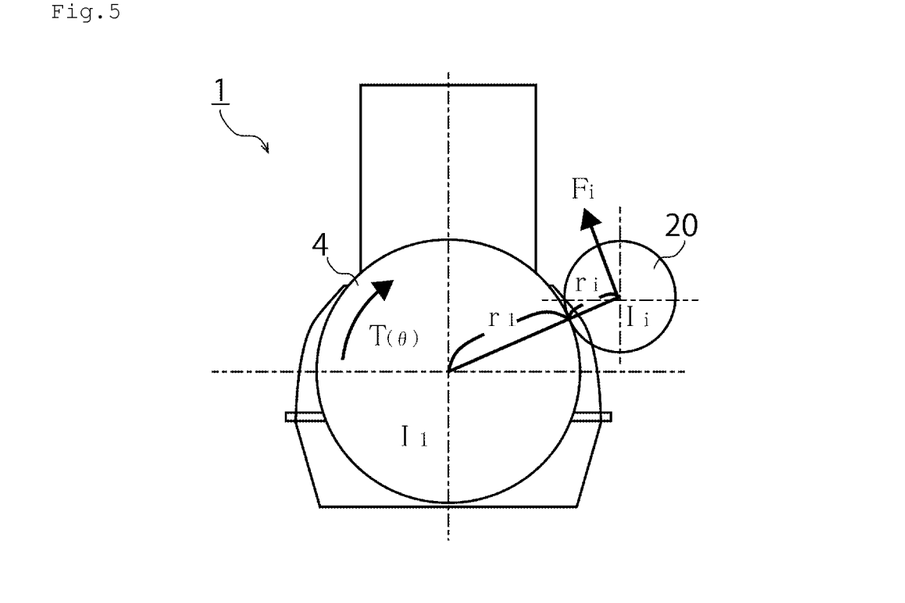
FIG. 5 is a schematic diagram showing a relationship between torque recoil force and moment of inertia in the internal combustion engine shown in FIG. 1.

Next, referring to FIG. 5, descriptions will be provided for a principle on which the reduction of the torque recoil force in the engine 1 is based. The following descriptions will be provided on the assumption that a rotating body 20 shown in FIG. 5 represents the primary balancer 12 and the auxiliary balancer 15 in combination.

The torque recoil force $T_r$ can be expressed with Equation (1) given below.

[Equation 1]

$$T_r = T(\theta) \times \frac{(I_1 + \sum g_i I_i)}{(I_1 + \sum g_i^2 I_i)} \quad (1)$$

where θ denotes the crank angle, T(θ) denotes the crank torque, $T_r$ denotes the torque recoil force, $I_1$ denotes the moment of inertia around the crankshaft 4, $I_i$ denotes the moment of inertia of an i-th rotating body 20, and $g_i$ denotes the gear ratio of the i-th rotating body 20, respectively.

In this equation, the denominator ($I_1+\Sigma g_i^2 I_i$) represents the effective moment of inertia of the engine 1, which is always a positive value irrespective of the direction of rotation. From Equation (1), the torque recoil force $T_r$ can be minimized by providing the rotating body 20 which rotates in the increased speed and in the direction reverse to that of the engine 1 in a way that minimizes the numerator ($I_1+\Sigma g_i I_i$).

The denominator of Equation (1) represents the effective moment of inertia around the crankshaft 4, and the crankshaft 4, the primary flywheel 5 and a clutch pressure plate (not illustrated) account for the majority thereof. The numerator represents the sum of products of the moments of inertia around the shafts and the corresponding gear ratios or pulley ratios. If there is a shaft which rotates in a reverse direction, the value corresponding to the shaft becomes negative. Thus, the numerator becomes smaller and the torque recoil becomes smaller accordingly.

As a consequence, the engine 1 shown in FIGS. 1 and 2 is capable of reducing the recoil force caused by the fluctuations in the torque of the engine 1 by use of the primary balancer 12 and the auxiliary flywheel 15.

Next, descriptions will be provided for how the engine 1 of the embodiment of the present invention works. First of all, descriptions will be provided for a case where the operating condition of the engine 1 is for normal running. During the normal running, the clutch 16 is in the engaged state in accordance with the method shown in FIG. 3, while each of the primary balancer 12 and the auxiliary balancer 15 rotates in the direction reverse to the rotation of the crankshaft 4, as shown in FIG. 5. For this reason, it is possible to reduce the torque recoil force caused by the fluctuations in the torque of the engine 1.

Figure 6:
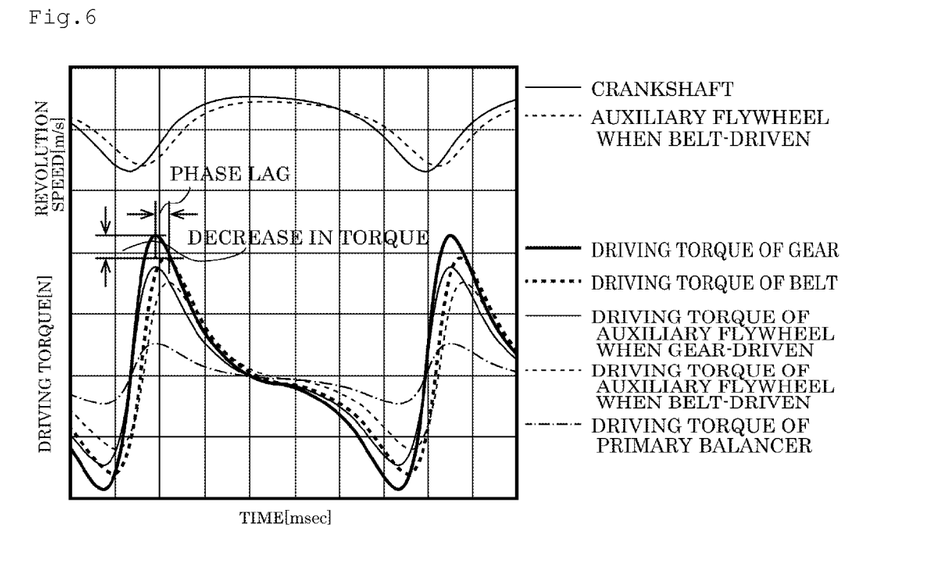
FIG. 6 is a graph showing driving torque of the internal combustion engine, when slips of a belt and phage lags are taken into consideration.

Since, however, the auxiliary flywheel 15 is driven by use of the belt drive device 13, slips, expansions and contractions of the belt 13b cause phase lags and reductions in the torque, thereby reducing torque used to reduce the torque recoil force, as shown in FIG. 6. With this taken into consideration, the ECU 18 compensates for driving torque equivalent to an amount reduced as a consequence of the belt driving (hereinafter referred to as an efficiency reduction-corresponding amount), thereby enabling the torque recoil force to be reduced.

Furthermore, since the driving torque borne by the electric motor 14 is reduced from the driving torque of the auxiliary flywheel 15 shown in FIG. 6, the meshing force of the gear drive device 11 can be reduced and the gear noises can be accordingly reduced.

The foregoing action is that which is carried out when the operating condition of the engine 1 is for normal running. Nevertheless, this action may be carried out only during constant running at low speed while the fluctuations in the torque are noticeable. Furthermore, the action may be carried out only at times of starting and stopping the engine 1 when rolling vibrations are noticeable. During the other driving modes, the clutch 16, for example, may be disengaged to make the moment of inertia smaller because the vibrations of the engine 1 are not so large. Since the output from the electric motor 14 during the normal running is used only to compensate for the efficiency reduction-corresponding amount of the driving torque, the power consumption can be reduced.

Next, descriptions will be provided for a case where the operating condition of the engine 1 is acceleration except for starting. During the acceleration, the clutch 16 is in the disengaged state in accordance with the method shown in FIG. 3. While the operating condition of the engine 1 is acceleration, the torque recoil force is smaller, and the meshing force of the gear drive device 11 is smaller as well. For these reasons, the driving torque of the auxiliary flywheel 15 is not needed. Accordingly, the disengagement of the clutch 16 makes it possible to suppress increases in the effective moment of inertia during the engine acceleration, to enhance the acceleration performance of the engine 1, and to enhance the fuel efficiency.

Next, descriptions will be provided for a case where the operating condition of the engine 1 is idling but the idling stop system is not in operation. While the operating condition is idling but the idling stop system is not in operation, the clutch 16 is in the disengaged state in accordance with the method shown in FIG. 3. Since the driving torque from the crankshaft 4 is less than the driving torque of the auxiliary flywheel 15, the disengagement of the clutch 16 makes it possible to reduce the meshing force of the gear drive device 11 which drives the primary balancer 12, and to reduce the gear noises.

During the idling, the controlling of the electric motor 14 in accordance with the method shown in FIG. 4 makes it possible to suppress the fluctuations in the torque of the engine 1. Thereby, the rolling vibrations caused during the idling can be reduced by driving the electric motor 14 alone.

Since the electric motor 14 is driven, the fuel efficiency seems to become worse than in the case of absorption by controlling the electric motor for power driving or regenerative driving while the clutch 16 is engaged. In many cases, however, the idling stop system is in operation during the idling, and the influence is accordingly small. While the idling stop system is in operation, the total fuel efficiency can be enhanced because a sort of dual mass flywheel is deemed to be in operation.

The foregoing engine 1 is capable of reducing the vibrations caused by the fluctuations in the torque of the engine 1 by being provided with the primary balancer 12 and the auxiliary balancer 15 which rotate in the direction reverse to the rotation of the crankshaft 4. Meanwhile, the gear noises occur since the primary balancer 12 is driven in association with the gear driving.

During the idling while the gear noises are particularly noticeable, since the meshing force of the gear drive device 11 can be reduced by disengaging the clutch 16 by use of the first means, the occurrence of the gear noises can be suppressed. In addition, since as the torque balancer, the electric motor 14 is power-driven or regeneratively driven by the second means, the torque recoil force can be reduced and the reduction in the rolling vibrations accordingly can be achieved.

During the constant running at low speed while the vibrations are noticeable due to the fluctuations in the torque, since the clutch 16 is engaged by the first means and the efficiency reduction-corresponding amount of the driving torque resulting from the belt driving can be compensated for by the second means, the fluctuations in the torque can be suppressed. In addition, at this time, since the meshing force of the gear drive device 11 decreases by an amount equivalent to the driving torque from the electric motor 14, the occurrence of the gear noises can be suppressed.

What is more, although the provision of the auxiliary flywheel 15 increases the moment of inertia, an increase in the effective moment of inertia around the crankshaft 4 can be suppressed during the acceleration since the clutch 16 is disengaged by the first means. Accordingly, deterioration in the fuel efficiency and delay in acceleration response, which both would otherwise occur due to the increase in the effective moment of inertia, can be suppressed.

The internal combustion engine of the present invention is capable of suppressing vibrations of the internal combustion engine by use of the gear-driven balancer, and reducing gear noises which occur as a consequence of the suppression of the vibrations. For this reason, the internal combustion engine of the present invention is applicable to a vehicle such as a truck in particular, which installs a diesel engine that involves higher in-cylinder pressure and larger fluctuations in the torque.

The invention claimed is:

1. An internal combustion engine comprising:
   a balancer which is driven by a crankshaft of the internal combustion engine via a gear drive device and rotates in a direction reverse to a direction in which the crankshaft rotates;
   an electric motor which is driven by the balancer via a belt drive device and rotates in a direction reverse to the direction in which the crankshaft rotates;
   a flywheel provided to a rotary shaft of the electric motor via a clutch; and
   a control unit configured to control torque to be transmitted to the gear drive device via the belt drive device by
      engaging or disengaging the clutch in accordance with an operating condition of the internal combustion engine, and
      power-driving or regeneratively driving the electric motor in accordance with a crank angular acceleration at least when the operating condition of the internal combustion engine is for normal running and idling.

2. The internal combustion engine according to claim 1, wherein
   the belt drive device includes a first pulley to rotate integrally with the balancer, and a second pulley to rotate faster than the crankshaft rotates by being belt-driven by the first pulley, and
   the belt drive device connects the flywheel to the second pulley via the clutch.

3. The internal combustion engine according to claim 1, wherein the control unit comprises:
   a compensator for reducing torque of the flywheel caused by the belt drive device by engaging the clutch and power-driving or regeneratively driving the electric motor when the operating condition of the internal combustion engine is for normal running;
   a device for reducing torque recoil force of the crankshaft by disengaging the clutch and power-driving or regeneratively driving the electric motor when the operating condition of the internal combustion engine is idling except idling stop; and
   a device for reducing effective moment of inertia around the crankshaft by disengaging the clutch when the operating condition of the internal combustion engine is acceleration except starting.

4. A method of controlling an internal combustion engine including a balancer which is gear-driven by a crankshaft of the internal combustion engine and rotates in a direction reverse to a direction in which the crankshaft rotates, and an electric motor which is belt-driven by the balancer and rotates in a direction reverse to the direction in which the crankshaft rotates, the method comprising:

controlling torque to be applied to the gear driving by:

engaging or disengaging the clutch in accordance with an operating condition of the internal combustion engine; and     power-driving or regeneratively driving the electric motor in accordance with a crank angular acceleration at least when the operating condition of the internal combustion engine is for normal running and idling.

5. The method of controlling an internal combustion engine according to claim 4, further comprising:

compensating for a reduction in torque of the flywheel caused due to the belt driving by engaging the clutch and power-driving or regeneratively driving the electric motor when the operating condition of the internal combustion engine is for normal running;

reducing torque recoil force of the crankshaft by disengaging the clutch and power-driving or regeneratively driving the electric motor when the operating condition of the internal combustion engine is idling except idling stop; and     reducing effective moment of inertia around the crankshaft by disengaging the clutch when the operating condition of the internal combustion engine is acceleration except starting.

6. The internal combustion engine according to claim 2, wherein the control unit comprises:

a compensator for reducing torque of the flywheel caused by the belt drive device by engaging the clutch and power-driving or regeneratively driving the electric motor when the operating condition of the internal combustion engine is for normal running;

a device for reducing torque recoil force of the crankshaft by disengaging the clutch and power-driving or regeneratively driving the electric motor when the operating condition of the internal combustion engine is idling except idling stop; and     a device for reducing effective moment of inertia around the crankshaft by disengaging the clutch when the operating condition of the internal combustion engine is acceleration except starting.

\* \* \* \* \*